United States Patent [19]

Austin et al.

[11] Patent Number: 4,624,425
[45] Date of Patent: Nov. 25, 1986

[54] FIXED WING LIGHT AIRCRAFT

[75] Inventors: Michael Austin, 575 Madison Ave., Suite 1006, New York, N.Y. 10022; B. Lyle Schofield, Lancaster, Calif.

[73] Assignee: Michael Austin, New York, N.Y.

[21] Appl. No.: 613,862

[22] Filed: May 23, 1984

[51] Int. Cl.⁴ .................... B64C 1/16; B64C 9/12
[52] U.S. Cl. ................ 244/13; 244/90 R; 244/135 R; 244/130; 244/137 A; 244/118.1; 244/54; 244/DIG. 14; 89/37.19
[58] Field of Search .......... 244/13, 122 R, 118.1, 244/235, 54, 90 R, 135 R, 130, 137 A, DIG. 1, 117 R; 89/1.815, 37.16, 37.19

[56] References Cited

U.S. PATENT DOCUMENTS

| | | | |
|---|---|---|---|
| D. 140,113 | 1/1945 | Biasell | 244/13 |
| 1,364,770 | 1/1921 | Lindberg | 244/135 R |
| 1,702,634 | 2/1929 | Gida et al. | 244/90 R |
| 1,847,237 | 3/1932 | Emery, Jr. | 89/37.19 |
| 2,149,298 | 3/1939 | Kuzelka | 244/135 R |
| 2,359,233 | 9/1944 | Martin | 244/122 R |
| 2,362,199 | 11/1944 | Glowka | 89/37.19 |
| 2,370,896 | 3/1945 | Weaver | 89/37.16 |
| 2,383,985 | 9/1945 | Ogg | 89/37.19 |
| 2,426,744 | 9/1947 | Pontius et al. | 89/39.19 |
| 2,433,146 | 12/1947 | Odell, Jr. | 244/235 |
| 2,443,105 | 6/1948 | Gordon | 89/37.19 |
| 2,927,749 | 3/1960 | Brownell | 244/130 |
| 2,958,260 | 11/1960 | Anderson | 89/1.815 |

OTHER PUBLICATIONS

Mitchell P-38 *Ultralight Aircraft*, by Markowski, Ultralight Publ. ©1981, pp. 91-92.
Pterodactyl, *Ultralight Aircraft*, by Markowski, Ultralight Publ. ©1981, pp. 99-101.

Color photograph of Prior Art aircraft showing fuselage and empennage and engine pylon.

*Primary Examiner*—Galen Barefoot
*Attorney, Agent, or Firm*—Hubbard, Thurman, Turner & Tucker

[57] ABSTRACT

A fixed wing powered light aircraft has a fuselage formed by laterally spaced longitudinal tubular booms supporting a twin vertical stabilizer and rudder assembly and a horizontal stabilizer. A tubular framework pylon structure is secured to the fuselage booms for supporting a propulsion engine driving a propeller arranged in a pusher configuration. An open cockpit is partially shrouded by a streamlined nose cowl and longitudinal cockpit side panels which meet along the longitudinal center line aft of the pylon. Two piece removable wing root fairings minimize drag and streamline airflow approaching the empennage. The aircraft is adapted for military applications with adjustable support brackets for aiming plural missile launch tubes on each wing. A pilot seat is mounted on an adjustable support structure comprising in eccentric arm and track for supporting longitudinal seat support rails. The engine fuel tank is supported by the pylon and includes an anti-slosh baffle dividing the tank into a main fuel reservoir and a sump portion having a connecting opening and a non-return valve to prevent starvation of the sump portion during violent in flight maneuvers. The main gear wheels are provided with hydraulic brake assemblies actuated by rudder pedal toe portions connected to hydraulic brake actuating cylinders mounted on the backsides of the rudder pedals. Adjustable machine gun mounts are disposed forward on each of the fuselage booms.

22 Claims, 17 Drawing Figures

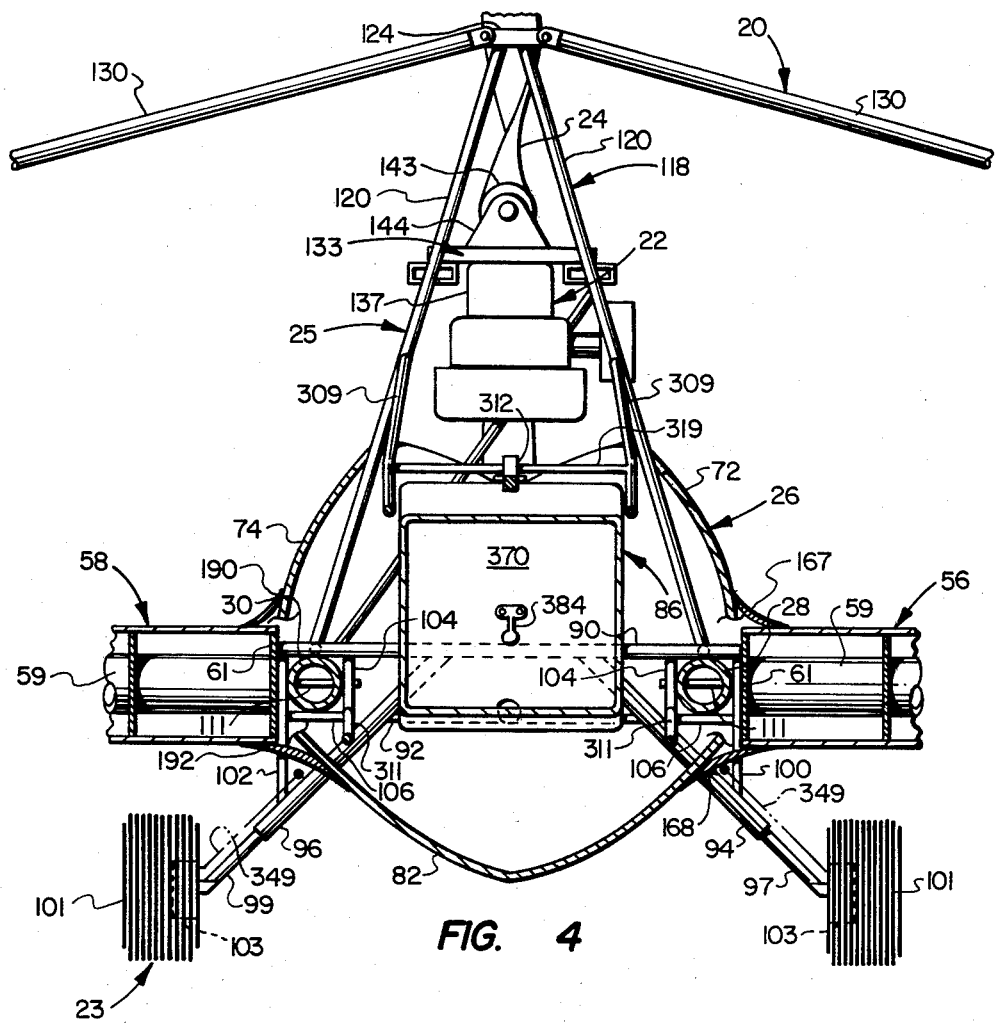
FIG. 4
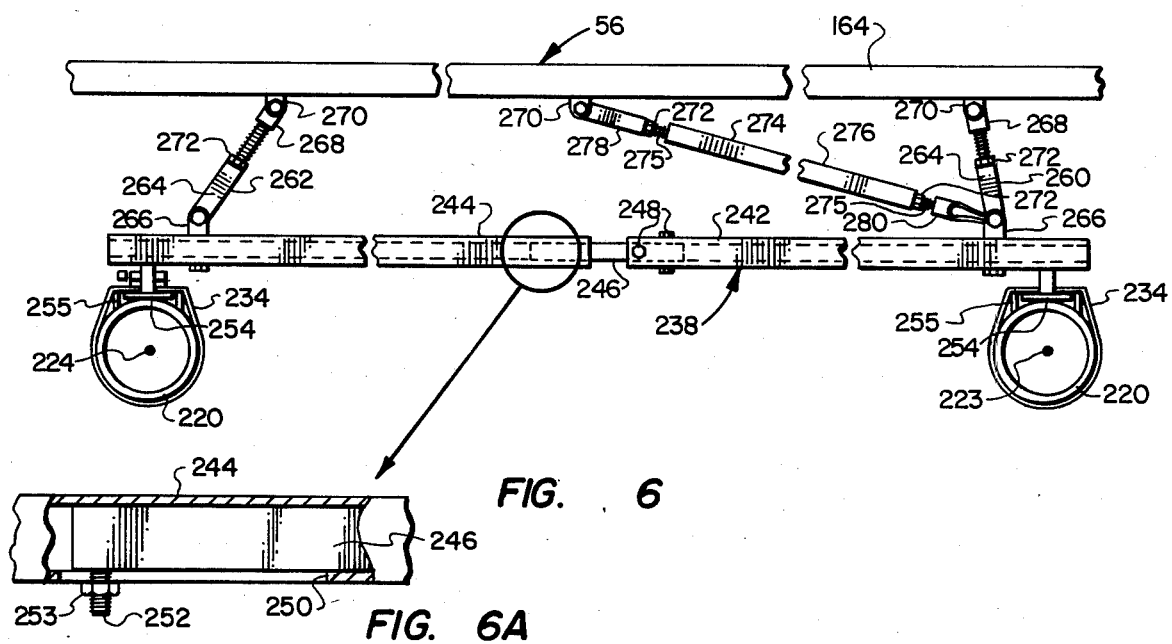
FIG. 6
FIG. 6A

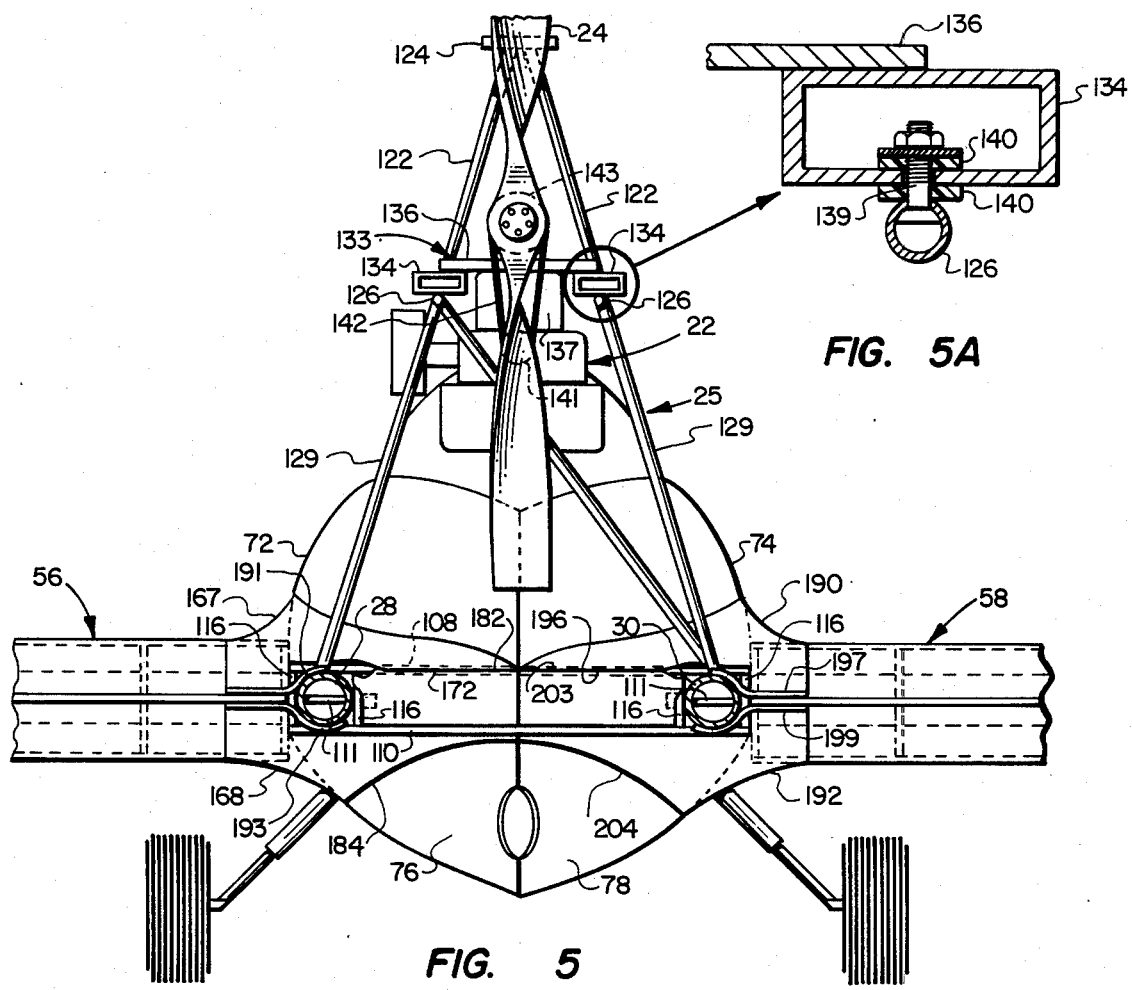
FIG. 5A
FIG. 5
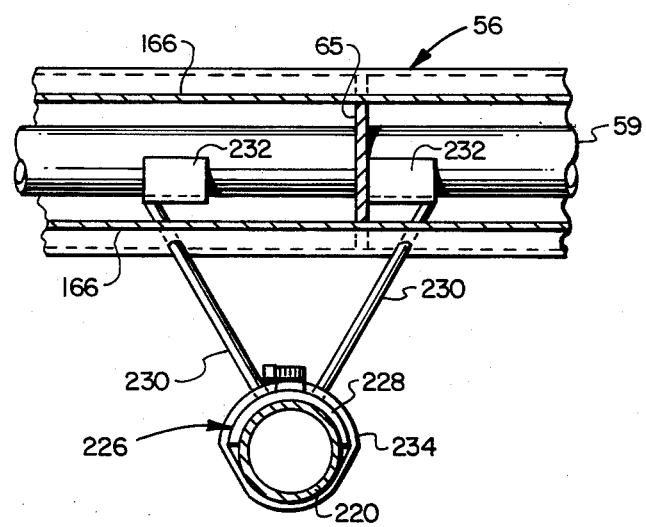
FIG. 7

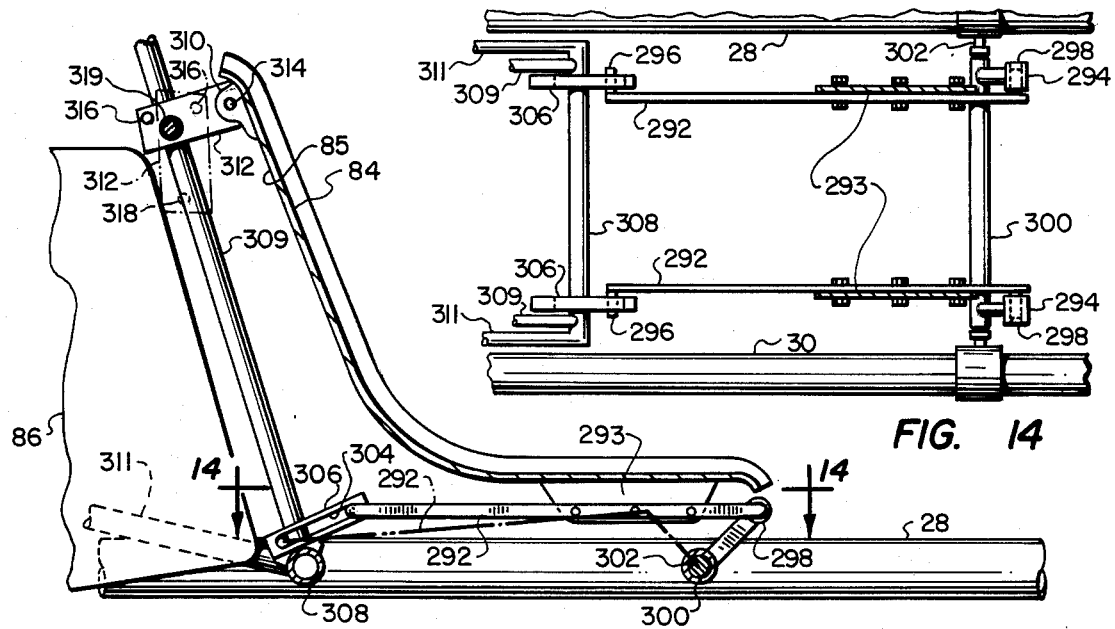
FIG. 10
FIG. 14
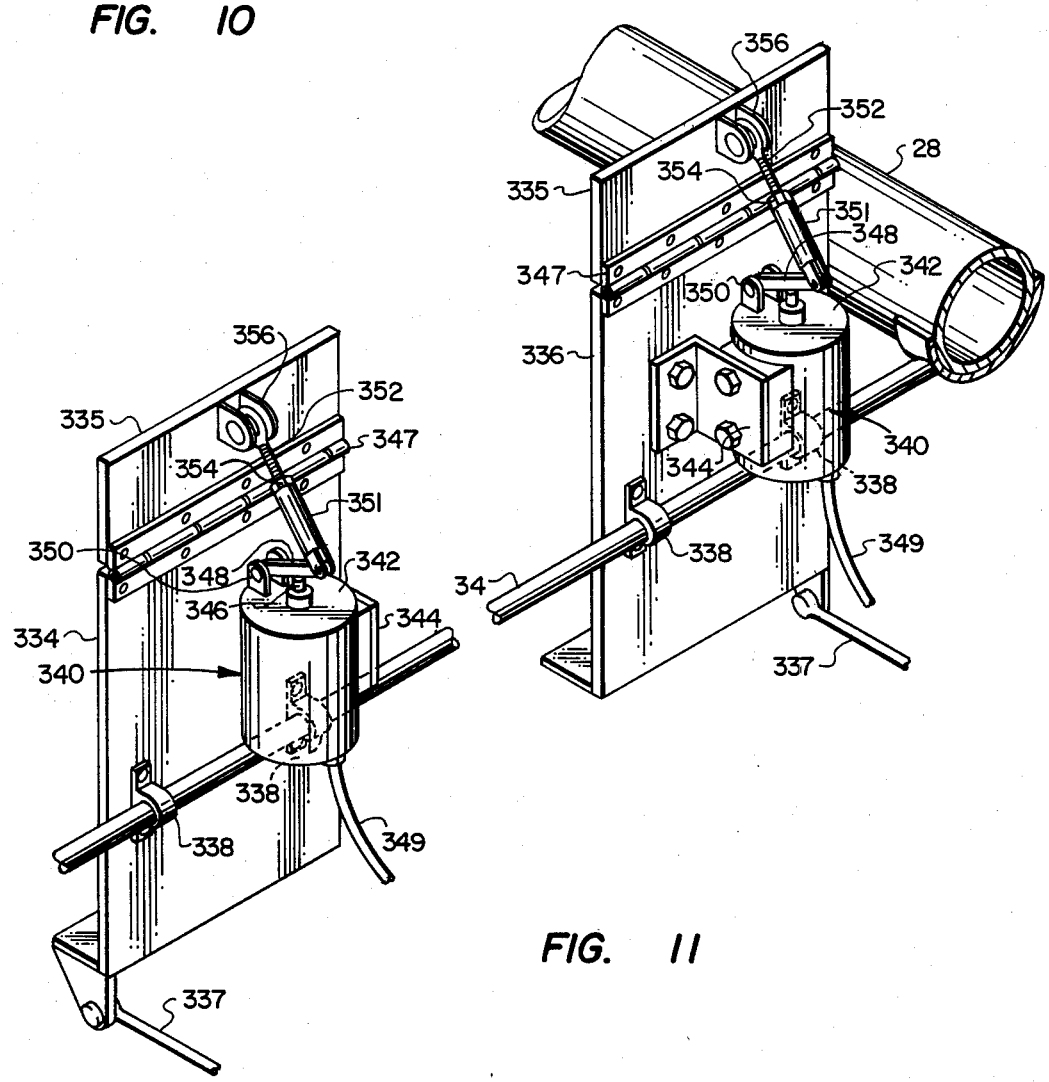
FIG. 11

ID:4,624,425

FIXED WING LIGHT AIRCRAFT

BACKGROUND OF THE INVENTION

1. Field of the Invention

The present invention pertains to a fixed wing, powered light aircraft having an open cockpit forward of a pusher type engine supported on a pylon structure. Missile launch tubes are supported under both port and starboard wing sections by adjustable tube support structure. Cockpit seating, fuel tank configuration and placement, fuselage and wing root fairings and rudder pedal mounted wheel brake control improvements are embodied in the improved aircraft.

2. Background

In the development of so-called ultralight, powered aircraft there have been several attempts to provide aircraft which are capable of performing utilitarian functions other than mere recreational use. However, for certain applications such as military close-air support and other tactical mission military uses, agricultural spraying and aerial surveillance for example, aircraft characterized by the light tubular frame single layer fabric airfoils have not been suitable. There has, in fact, been a continuing need for a rugged light aircraft which is designed for low cost production, and may be adapted for military as well as commercial use. Aircraft of this type have also typically required performance capabilities including short take off and landing capability on rugged or unimproved airstrips and the ability to be disassembled for over the road surface transport. To this end there have been several problems in the development of aircraft which meet all of the desideratum for a lightweight one or two man vehicle. The aircraft of the present invention overcomes several problems in the prior art as will be appreciated by those skilled in the art of fixed wing light aircraft.

SUMMARY OF THE INVENTION

The present invention provides an improved fixed wing powered aircraft which is generally characterized by a fuselage comprising two laterally spaced apart longitudinal tubular booms, demountable port and starboard wing sections, each having a single tubular main spar, and a propulsion engine of the co-called pusher type mounted on a unique load bearing tubular frame type pylon disposed rearward of the cockpit.

In accordance with one aspect of the present invention there is provided a fixed wing light aircraft of the general type described herein having an open cockpit shrouded by a forward streamlined nose cowl, longitudinal side panels extending rearwardly over substantially the entire chordal length of the wing sections at the wind root and a curved fairing terminating rearwardly of the wind but forward of horizontal and vertical stabilizers which are mounted at the aft end of longitudinal fuselage booms.

In accordance with another aspect of the present invention there is provided a fixed wing powered light aircraft having an improved adjustable pilot seat support structure for adjusting the seat position.

The seat is mounted in such a way as to be at least partially supported by a unique tubular frame pylon structure which also supports the propulsion engine, fuel tank, main landing gear and is directly connected to the aircraft wing sections.

In accordance with a further aspect of the present invention, there is provided a fixed wing light aircraft having conventional rudder controls characterized by left and right rudder pedals which are configured to include respective landing gear brake actuator pedal sections and pedal mounted hydraulic brake cylinders for applying hydraulic pressure to actuate landing gear wheel brakes. An improved arrangement of mounting the brake hydraulic actuating cylinders on the pedals themselves simplifies the brake hydraulic circuitry and actuator linkage.

In accordance with a particularly important aspect of the invention there is provided a low wing light monoplane having improved armament support structure for military applications including support bracket assemblies on each wing section, preferably disposed on the underside thereof and comprising a forward support bracket supported by the main wing spar and adapted to releasably support a missile launch tube. Each support bracket assembly also includes a rear tube support bracket which is supported on adjustable linkage depending from the wing trailing edge. Each wing is preferably provided with a plurality of launch tubes interconnected by bracket linkage which is adapted to adjust the elevation of the launch tubes, as well as the lateral bearing or azimuth of the tubes for aiming at a target point forward of the aircraft. The aircraft of the present invention is also characterized by opposed adjustable gun mounts secured to longitudinal fuselage booms.

In accordance with improved streamlining and a reduced drag configuration of the aircraft a unique wing root fairing structure is provided which is comprised of at least two fairing panels which may be easily demounted from the wing-fuselage juncture to facilitate access to the respective wing sections for disassembly from the fuselage. The improved wing root fairing comprises at least two sections, one of which includes an upper wing surface fairing extending from the rear of the wing and extending inboard to the curved fairing of the fuselage panels and from this point forward toward the leading edge of the wing section. The other wing root fairing member extends around the leading edge and along the underside of the wing section rearwardly and complements the portion of the upper fairing which comprises a filler between the trailing edge of the wing and the fuselage booms to substantially eliminate turbulent air flow rearwardly from the cockpit section of the fuselage over the horizontal and vertical stabilizer members.

In accordance with still other aspects of the present invention there is provided an improved fuel tank structure and mounting arrangement in a light aircraft wherein a high capacity fuel tank is advantageously mounted near the aircraft center of gravity, is provided with an anti-slosh baffle, and is also provided with a non-return valve to assure that fuel supply remains in the portion of the tank from which fuel is being withdrawn by the fuel conduit system leading to the propulsion engine so as to minimize fuel starvation during violent airborne maneuvers.

The present invention provides several improvements in powered fixed wing light aircraft including features which enhance the utility of such aircraft for military as well as other nonrecreational functions. At least some of the improvements described herein and comprising part of the invention provide a somewhat synergistic effect in the advancement of the art of fixed wing light aircraft of the general type described. Those skilled in the art will recognize the foregoing improve-

BRIEF DESCRIPTION OF THE DRAWING

FIG. 4 is a section view taken generally along the line 4—4 of FIG. 2;

FIG. 5 is a section view taken along line 5—5 of FIG. 2;

FIG. 5a is a detail view on a larger scale of one of the engine mounts;

FIG. 6 is a view taken from the line 6—6 of FIG. 2 showing the structure for the rear missile tube support brackets;

FIG. 6a is a detail view on a larger scale taken from FIG. 6;

FIG. 7 is a view taken along line 7—7 of FIG. 2 showing a forward launch tube support bracket;

FIG. 10 is a section view taken along line 10—10 of FIG. 2 showing details of the pilot seat support structure;

FIG. 11 is a detail perspective view of the combination rudder and brake actuating pedals showing the brake cylinder mounting structure;

FIG. 14 is a view taken from line 14—14 of FIG. 10; and

DETAILED DESCRIPTION OF THE PREFERRED EMBODIMENT

Figure 1:
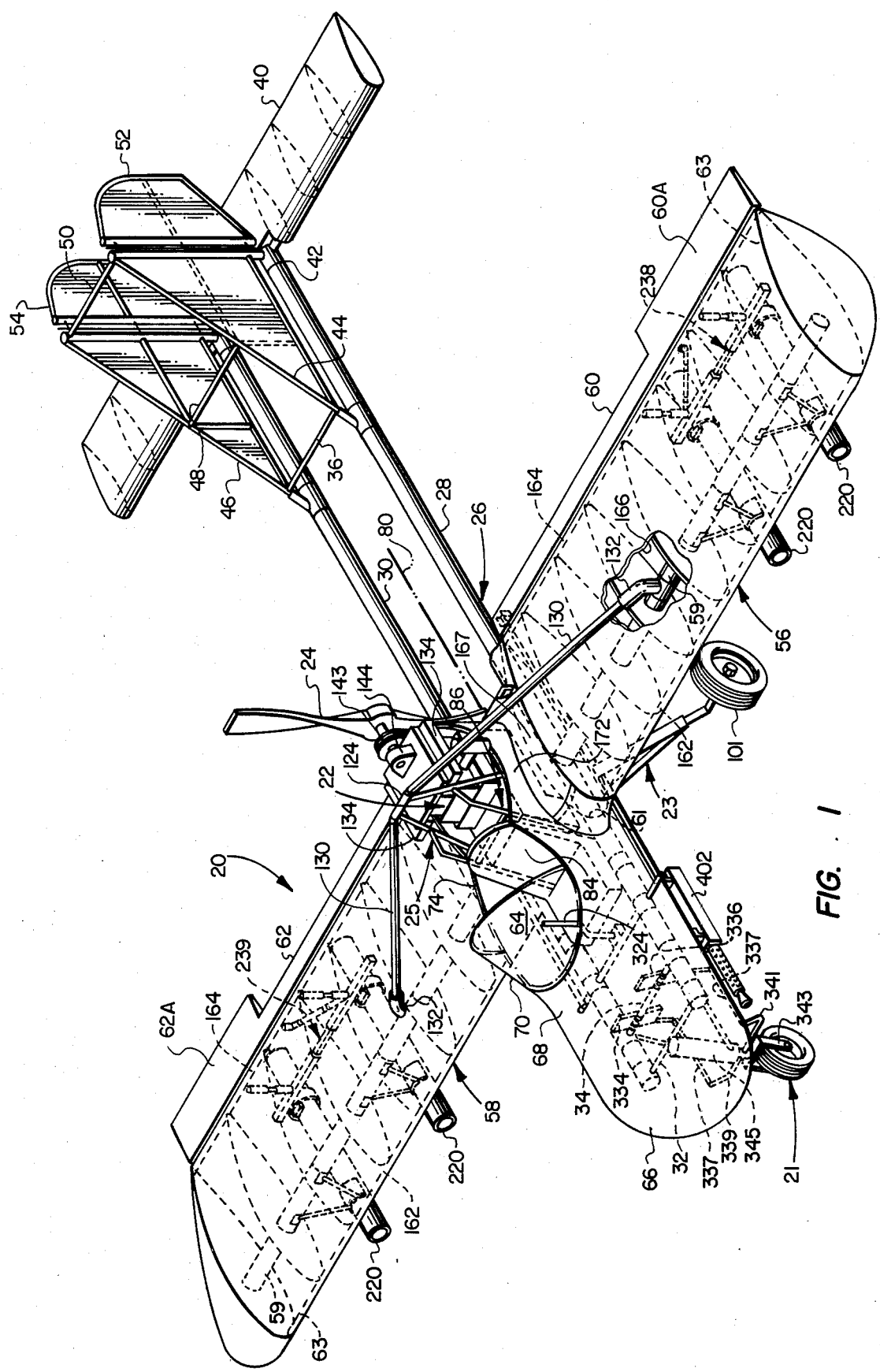
FIG. 1 is a perspective view of the aircraft of the present invention.

In the description which follows like parts are marked throughout the specification and drawing with the same reference numerals, respectively. The drawing is not necessarily to scale and certain features of the invention may be shown exaggerated in scale or in schematic form in the interest of clarity and conciseness.

Figure 2:
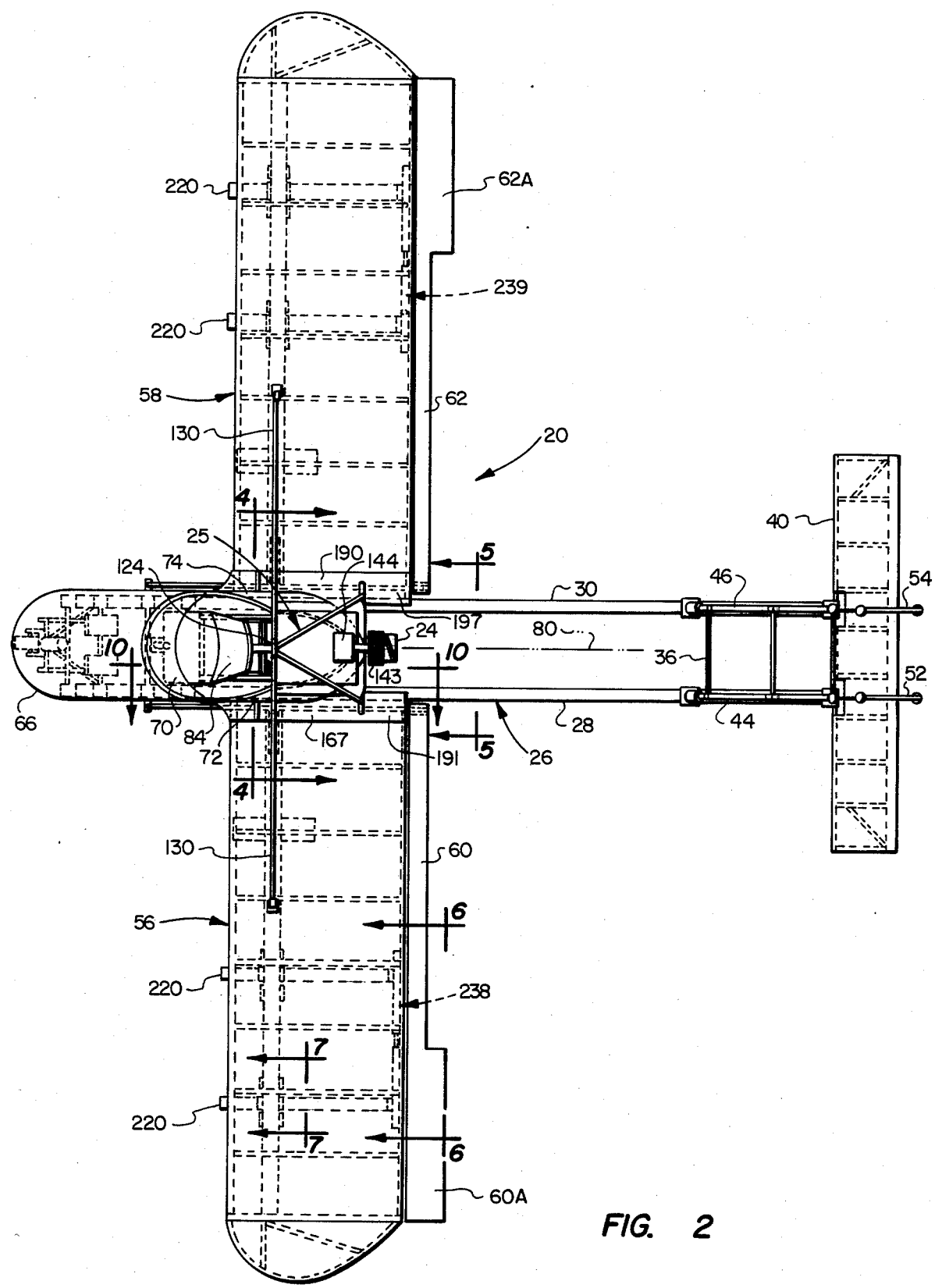
FIG. 2 is a top plan view of the aircraft of FIG. 1.
Figure 3:
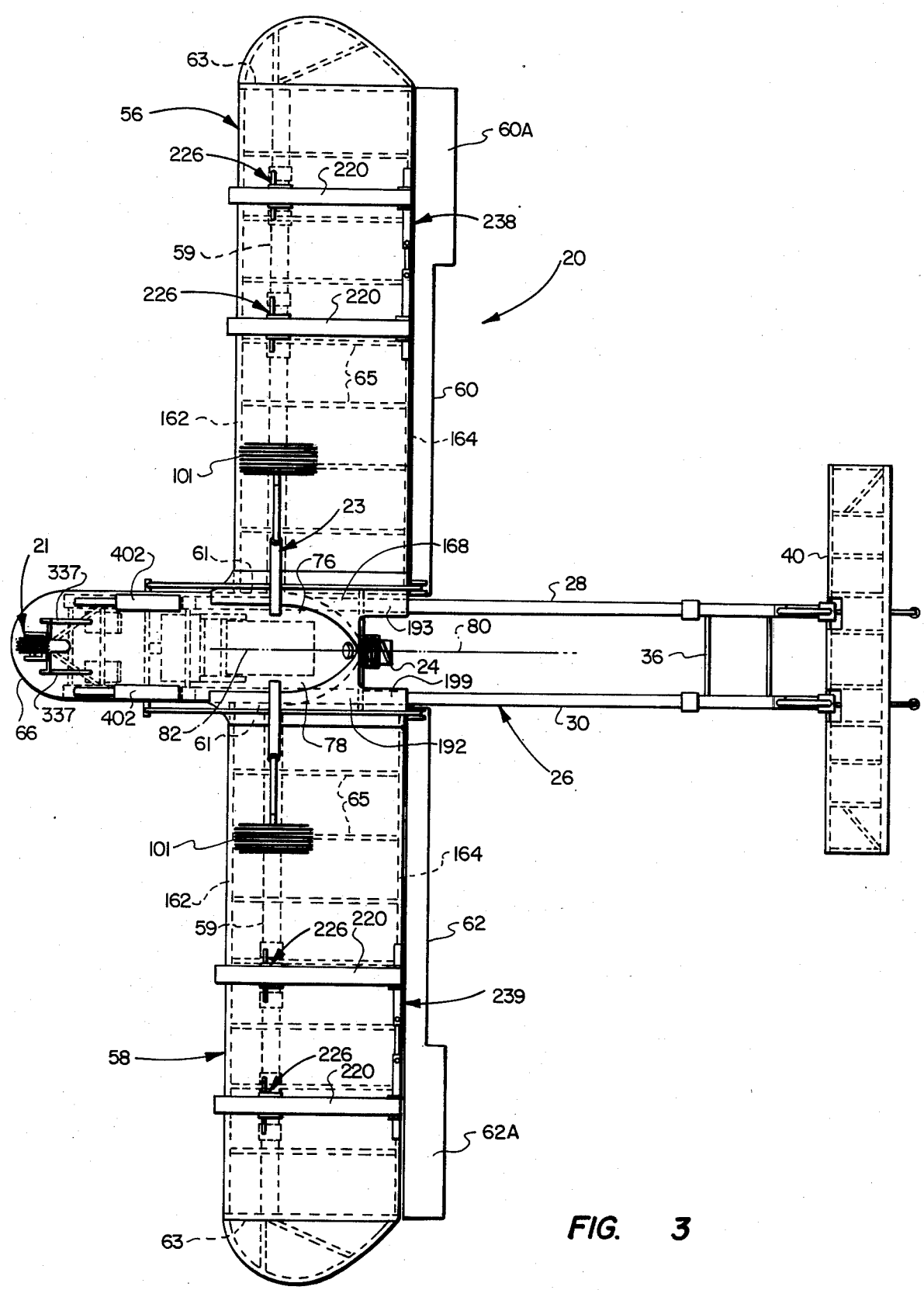
FIG. 3 is a bottom plan view of the aircraft.

Referring to FIGS. 1, 2, and 3 there is illustrated an improved fixed wing powered aircraft in accordance with the present invention and generally designated by the numeral 20. The aircraft 20 is characterized as a fixed low wing monoplane hving a single propulsion engine 22 arranged in pusher configuration with an output shaft connected to a single two blade propeller 24. The engine 22 comprises a reciprocating piston inline multicylinder inverted air cooled type, although other reciprocating piston or rotary and turbine types may also be used. The engine 22 is suitably supported on a tubular frame pylon 25 in a manner to be described in further detail herein. The aircraft 20 is characterized by a fuselage 26 and tricycle type landing gear comprising a steerable nose wheel 21 and main gear assembly 23. The fuselage 26 includes laterally spaced apart longitudinally extending tubular booms 28 and 30. The booms 28 and 30 are interconnected at spaced apart points by transverse braces 32, 34 and 36. A combination horizontal stabilizer and elevator 40 is hingedly connected to the aft end 42 of the fuselage to provide the elevator control surface for the aircraft 20. Twin vertical stabilizers or fins 44 and 46 are mounted on respective ones of the fuselage booms 28 and 30, are interconnected by lateral braces 48 and 50 and support respective hinged rudder sections 52 and 54.

The aircraft 20 is provided with a relatively low aspect ratio wing comprising respective port and starboard wing sections 56 and 58, each secured to and demountable from the fuselage 26 in a manner to be described herein. The wing sections 56 and 58 are provided with substantially full length trailing edge mounted ailerons 60 and 62, respectively. The ailerons 60 and 62 each include respective sections 60a and 62a extending over about 33% of the span of the ailerons at the outboard ends thereof. The aileron sections 60a and 62a have a chordal length about twice the remaining portions of the ailerons to provide improved roll axis stability for the aircraft 20. The control surfaces provided by the elevator 40, the rudders 52 and 54, and the ailerons 60 and 62 are suitably connected to control means disposed forward of the wing in a cockpit, generally designated by the numeral 64. The cockpit 64 is of an open type having a generally shell-like enclosure including a streamlined nose cowl 66 forming a hood 68 supportive of a pilot wind-screen 70. The cockpit 64 is also enclosed by longitudinally extending port and starboard side panels 72 and 74 which terminate rearwardly of the pylon 25 in curved sections 76 and 78 which meet at a longitudinal central axis 80, FIG. 3.

The cockpit enclosure also includes a bottom panel 82, FIGS. 4 and 5 also, which extends rearwardly from the nose cowl 66 and curves upwardly toward the respective booms 28 and 30 in a lateral direction from the longitudinal center line of the fuselage and also upwardly in a rearward direction to form a somewhat canoe stern type aft section for the cockpit enclosure. The panel 82, as well as the panels 72,76 and 74,78, substantially enclose the aft end of the cockpit which is fitted with a pilot seat, generally designated by the numeral 84, and an engine fuel supply tank 86 mounted between the fuselage booms 28 and 30 and rearwardly of the pilot seat 84. The configuration of the cockpit panels 72,76 and 74,78 together with the bottom panel 82 substantially reduces turbulence of the airflow approaching the elevator 40 and the fins 44 and 46. The airflow around the aft portion of the fuselage enclosure described above as well as the airflow along wing root portions of the respective port and starboard wing sections 56 and 58 is further controlled and drag is reduced on the aircraft 20 by the provision of improved multipiece wing root fairings to be described further herein in conjunction with FIGS. 8 and 9.

Figure 12:
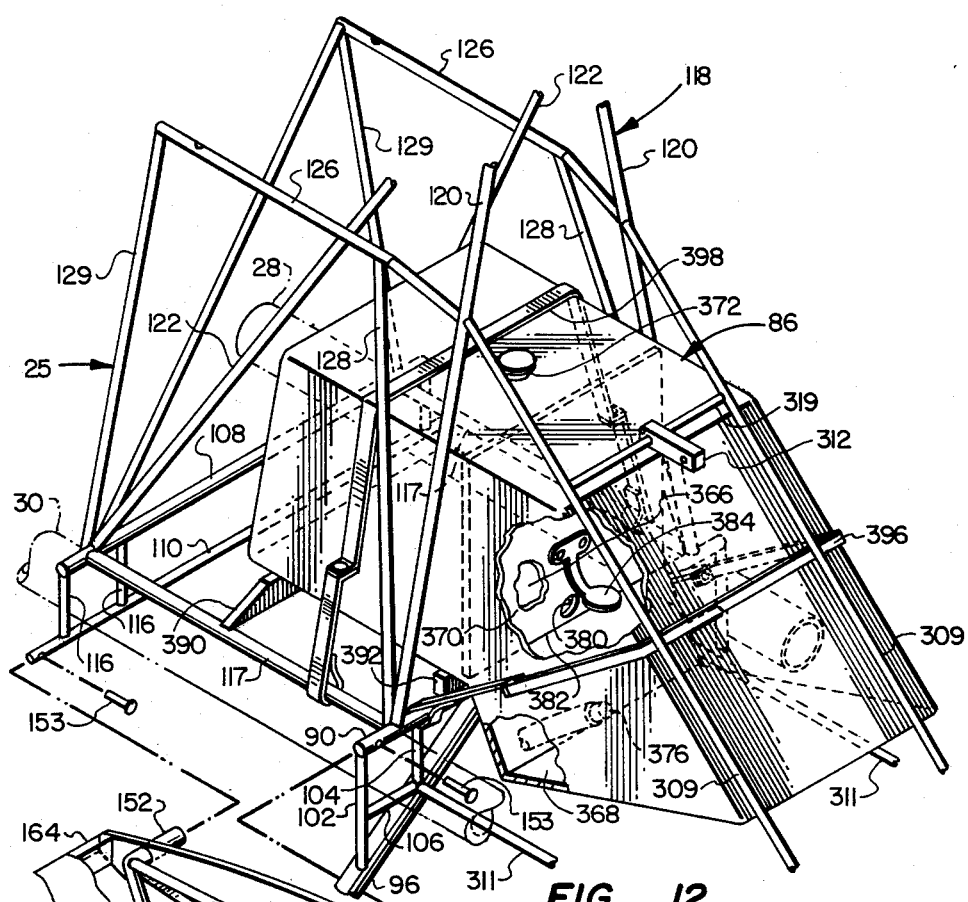
FIG. 12 is a perspective view of the pylon structure and the engine fuel tank.

Referring to FIGS. 4, 5 and 12, the pylon 25 comprises a tubular aluminum or similar alloy frame including transverse frame members 90 and 92 which are interconnected to opposed landing gear strut members 94 and 96. Spaced apart vertical braces 100 and 102, FIG. 4, depend from the tube 90 and are secured to the struts 94 and 96, respectively. Secondary tubes 104 and 106 are interconnected to each other and to the braces 90, 100 and 102 as, shown in FIG. 4, to form enclosures for the respective booms 28 and 30. The struts 94 and 96 support respective main gear axle assemblies 97 and 99, each of which support a pneumatic tired wheel 101. The wheels 101 are each provided with a conventional hydraulically actuated brake assembly 103. The pylon 25 is secured to the fuselage booms 28 and 30 by bolts 111, FIG. 4, which extend between the respective vertical tube brace member 102 and intermediate tube brace members 104. The pylon 25 also includes a second set of lateral tubular brace members 108 and 110, FIGS. 5 and 12, and spaced apart pairs of vertical members 116 which also enclose the booms 28 and 30. In like manner bolts 111 also extend between adjacent ones of vertical brace members 116, interconnecting the rear transverse tubular brace members 108 and 110, and through the respective booms 28 and 30.

The pylon 25 further includes opposed longitudinal brace members 117, FIG. 12, interconnecting the transverse members 90 and 108, and a generally vertically extending tower portion 118. The tower portion 118 includes generally vertically extending opposed angle braces 120 and 122, FIGS. 4, and 12, which extend to an apex brace member 124. The pylon 25 also includes longitudinally extending engine mount members 126 braced by depending leg members 128 and 129. The tower apex brace member 124 is adapted to support opposed wing struts 130 which depend from the member 124 and are releasably bolted thereto. The struts 130 extend to respective socket members 132, see FIG. 1, on each of the wing sections 56 and 58. The socket members 132 are each suitably connected to a main wing spar 59 of each wing section 56 and 58 to be decribed in further detail herein.

As shown in FIG. 5, the engine 22 is underslung from an engine mount 133 comprising opposed longitudinal rectangular tube members 134 supported on the respective members 126 and interconnected by a transverse web part 136. The entire engine 22 is supported on the web part 136 by bolts, not shown, which extend through the web part and are secured to the engine crankcase 137. The engine amount 133 is secured to each of the tubular members 126 by bolt and nut assemblies 139, as shown by way of example in FIG. 5a, including interposed resilient vibration isolation washers 140. The engine 22 is drivingly connected to the propeller 24 through a transmission including a power takeoff shaft pulley 141, endless flexible belts 142 and a driven pulley 143 connected to the propeller and supported by a bearing 144, FIGS. 1 and 4.

Referring to FIGS. 1 and 3, each of the wing sections 56 and 58 includes a main tubular spar 59 extending from a wing root rib 61 to a wing tip rib 63. Intermediate ribs 65 also are secured to the spars 59 and to wing longitudinal leading edge stringers 162 and trailing edge stringers 164. The brackets 132 are suitably secured to the respective spars 59 and extend through wing surface coverings 166. Covering 166 may comprise relatively thin sheet metal, composite materials, plastic or doped fabric. The actual construction of the wing coverings 166 is not believed to be necessary to enable one skilled in the art to practice the present invention and will not be described further herein.

Referring briefly to FIG. 12, there is illustrated the arrangement of the connection of the wing section 58 to the fuselage 26. Means forming laterally projecting trunnions 150 and 152 are adapted to be received in cooperating supports formed by the open ends of tubular pylon members 90 and 110. The trunnions 150 and 152 are secured to the members 90 and 110 by suitable pins 53 to releasably secure the wing section 58 to the fuselage 26. The trunnion 150 is suitably secured to the end of spar 59 and the trunnion 152 is secured to a strut assembly 155. The wing section 56 is connected in a similar manner to the opposite ends of the pylon members 90 and 110.

Figure 8:
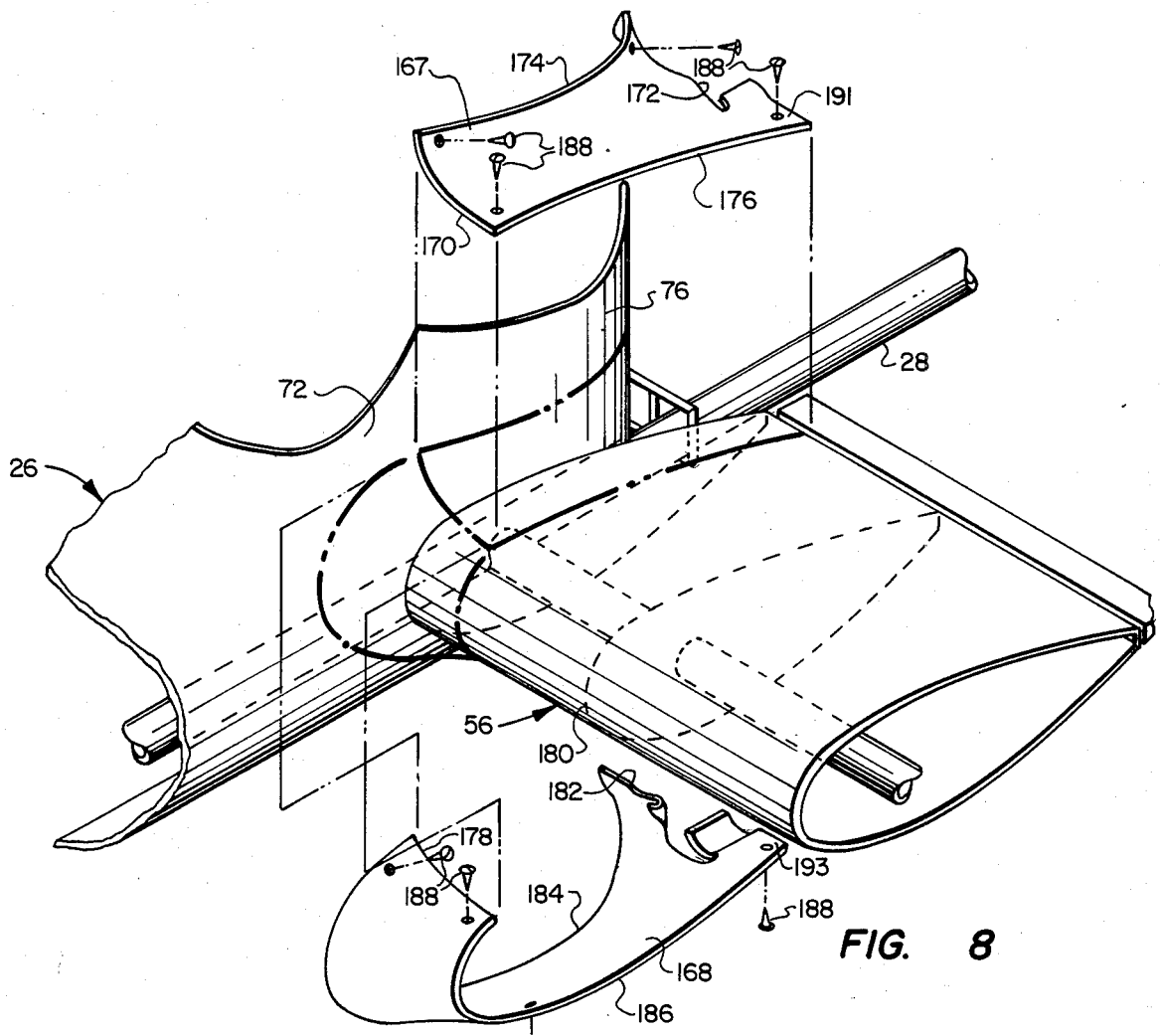
FIG. 8 is an exploded perspective view of the wing root fairings for the port wing section.

Referring to FIGS. 5 and 8, the aircraft 20 is provided with an improved wing root fairing structure for each wing section and characterized by at least two fairing panels 167 and 168 for the wing section 56. The fairing 167 extends from a forward end 170 to a transverse rear end 172 aligned with and contiguous with the transverse pylon brace member 108. The fairing 167 is contiguous with the fuselage panel 72, 76 along a continuous edge 174, and the fairing 167 is contiguous with the upper surface of the wing section 56 along an edge 176. The second fairing panel 168 extends from an edge 178, overlapping the leading edge 170 of the fairing 167, around the leading edge 180 of wing section 56 and rearwardly to a transverse rear edge 182 adapted to be substantially contiguous with the rear edge 172 of fairing 167. The fairing 168 includes a marginal edge 184 contiguous with fuselage panel 72, 76 and a marginal egde 186 adapted to be contiguous with the surface of wing section 56. The fairing panels 167 and 168 are secured to the fuselage 26 and wing section 56 by removable threaded fasteners 188 at selected spaced apart points. The fasteners 188 may be of the self tapping type suitable for securing relatively thin section metal or fiberglass panels to each other.

Figure 9:
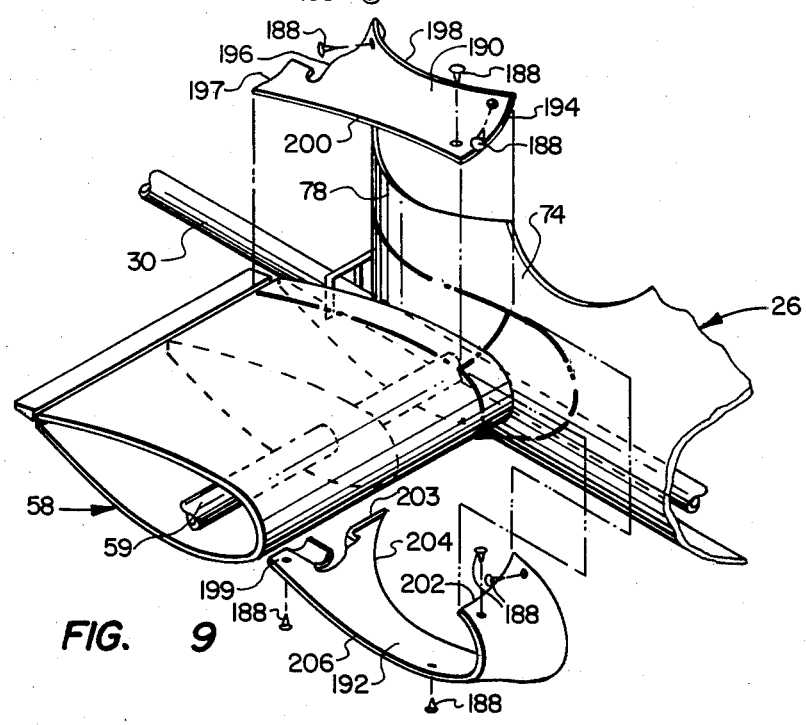
FIG. 9 is an exploded perspective view of the wing root fairings for the starboard wing section.

Referring to FIGS. 5 and 9, drag and turbulence creating airflow are also minimized at the root of wing section 58 by fairing panels 190 and 192 which are virtually identical to and comprise mirror images of the panels 167 and 168, respectively. The fairing 190 includes a forward edge 194 and rear edge 196 and longitudinal edges 198 and 200 constructed to be contiguous with the fuselage 26 and the wing section 58, respectively. The fairing 192 includes an edge 202 overlapping the forward edge 194 of fairing 190 and a rear edge 203 constructed to be contiguous with the rear edge 196 of fairing 190 and the member 108. Fairing 192 has marginal edges 204 and 206 formed to be contiguous with the fuselage and the wing section 58, respectively.

The fairing panels 190 and 192 are also secured to the fuselage 26 and wing section 58 by spaced apart fasteners 188 in the same manner as the panels 167 and 168. Thanks to the configuration of the fairings 167, 168, 190 and 192 airflow along the wing roots over the upper and lower surface of the wing sections 56 and 58, and rearward thereof, is relatively undisturbed as it approaches the horizontal and vertical stabilizers.

The rearward portions 191, 193, 197 and 199 of the respective fairing panels 167, 168 and 190, 192 form continuations of the trailing edges of the respective wing sections 56 and 58 and are contoured to extend at least partially around the circumference of the booms 28 and 30. The fairing panels 167, 168, 190 and 192 are preferably molded of fiberglass and are sufficiently flexible enough to be deflected to facilitate assembly and disassembly with respect to the curved surfaces of the respective fuselage portions and wing sections.

Figure 13:
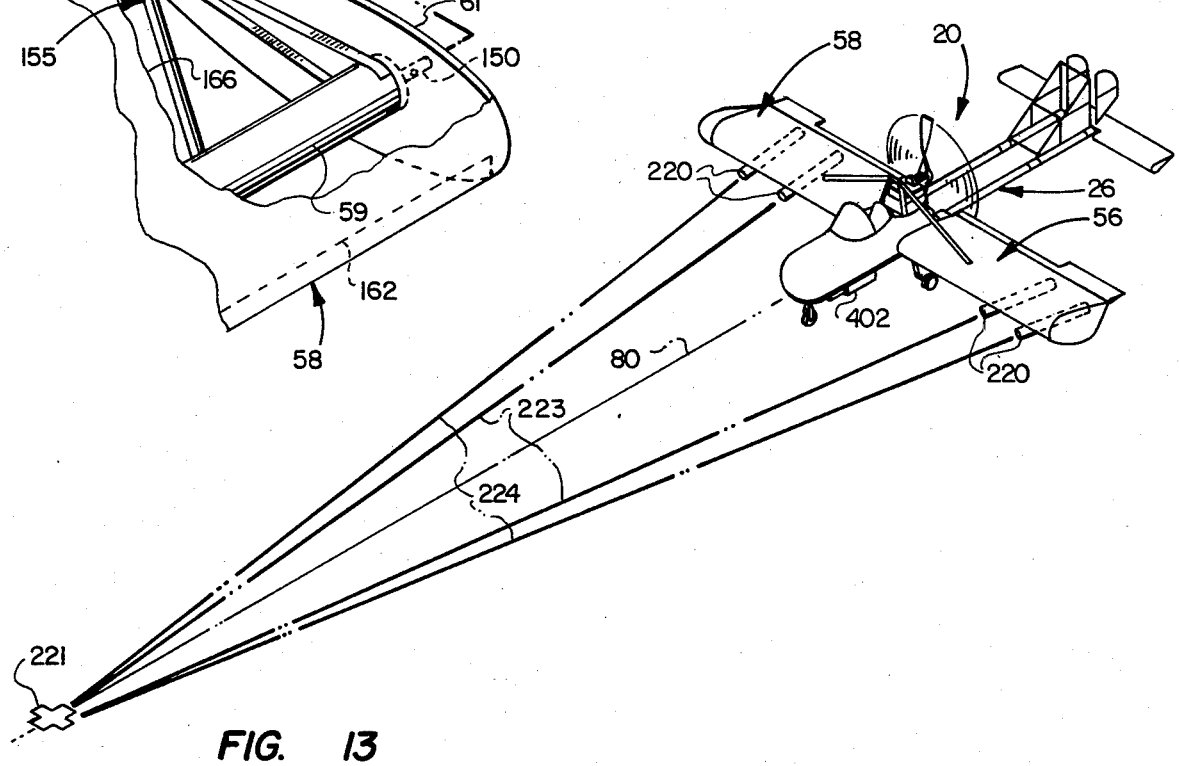
FIG. 13 is a perspective diagram.

Referring now to FIGS. 3, 6, 7 and 13, the construction of support structure for wing mounted missile launch tubes will now be described. Referring first to FIGS. 3 and 13, the aircraft is adapted to be provided with a plurality of missile support and launch tubes 220 suitably mounted on the underside of each of the wing sections 56 and 58 and adapted to be aimed at a target point 221, FIG. 13, forward of the aircraft 20, as indicated by respective converging axes 223 and 224. The missile tubes 220 are supported at their forward ends by respective support brackets 226, as shown by way of example in FIG. 7, spaced apart on the underside of each wing section 56 and 58 directly beneath and supported by the main spars 59. The brackets 226 each comprise partial cylindrical saddle members 228 which are welded to upwardly diverging tubular struts 230. The struts 230 each extend through wing surface coverings 166 and are suitably welded at their opposite ends to generally cylindrical tubular saddle members 232 secured to the underside of spar 59. The saddle members 228 supports a band clamp 234 for releasably securing a tube 220 to the support bracket 226.

Referring now to FIG. 6, an adjustable missile launch tube support bracket assembly 238 is illustrated in vertical elevation and secured to wing section 56. The support bracket assembly 238 is adapted to support the aft end of the adjacent missile launch tubes 220 adjustably for aiming the launch tubes at target 221. A similar bracket assembly 239 FIGS. 1 and 3, comprises a mirror image arrangement of the structure of the bracket assembly 238 and is secured to the underside of the trailing edge of wing section 58. For the sake of brevity only the structure of bracket assembly 238 will be described in detail herein. Since the outboard launch tube 220 on each wing section must have a bearing angle with respect to the axis 80 greater than the inboard launch tube, the axes 223 and 224 of the respective adjacent launch tubes on a wing section must converge toward the target point 221, as illustrated in FIG. 13. Alternately, the outboard launch tubes 220 on each wing section 56 and 58 may be aimed at a target point farther ahead of the target point 221. Although the forward supports 226 are fixed, the tubes 220 are of sufficient length that the aft ends of the tubes may be displaced to align the tubes such that their longitudinal central axes 223 and 224 converge at a target point which, typically, is predetermined to be 500 to 1500 yards forward of the aircraft 20 at the time of missile launch.

The bracket assembly 238 comprises an elongated adjustable length support beam characterized by two rectangular cross-section tubular members 242 and 244 which are interconnected by a length adjusting link 246. The bracket tube 242 is in receipt of one end of the link 246 and is secured thereto with bolt and nut assemblies 248. The bracket tube 244 includes a longitudinally extending slot 250, FIG. 6a, through which a stud 252 extends and which is secured to the opposite end of the link 246. A nut 253 is threaded on the stud 252 for securing the tubes 242 and 244 in a preselected longitudinal position relative to each other. The bracket tubes 242 and 244 each include a depending support bracket member 254 for supporting the aft ends of respective missile support and launch tubes 220 by means such as adjustable band clamps 234, for example. The brackets 254 are each preferably supported in a slotted boss 255 forming a part of tube 220. The bracket assembly 238 also includes generally vertically depending support link members 260 and 262. The link 260 includes an internally threaded tubular clevis member 264 pivotally connected to an eyebolt member 266 secured to the bracket member 242. The clevis 264 is threadedly connected to an eye bolt 268 pivotally secured to a bracket 270 depended from the wing trailing edge stringer 164. A lock nut 272 is threadedly engaged with the shank portion of the eye bolt 268 to lock the clevis and eyebolt in a predetermined longitudinally adjusted position with respect to each other.

The link 262 also comprises a clevis 264 pivotally connected to an eyebolt 266, which is secured to the bracket tube 244, and threadedly engaged with an eyebolt 268 pivotally secured to a second bracket 270. The bracket 270 associated with the link 262 is also secured to the trailing edge stringer 164. A locknut 272 is threaded over the shank of the eyebolt 268 of the link 262 for adjusting the length of the link.

The bracket assembly 238 further comprises an adjustable strut 274 comprising a tube 276 having opposed threaded shank portions 275 threadedly engaged with opposed clevis members 278 and 280. The clevis member 278 is pivotally connected to an eyebolt 270 secured to the trailing edge stringer 164 at a point between the connection of the links 260 and 262 to the stringer. The clevis member 280 is pivotally connected to the bracket tube 242 at the connection of the link 260 to the bracket tube. The length of the strut 274 may be adjusted by rotating the tube 276 to adjust the threaded engagement of the tube with the opposed clevis members 278 and 280 and locked in position by suitable locknuts 272.

Accordingly, the vertical elevation and lateral position of the spaced apart support brackets 254 may be adjusted relative to each other by adjusting the position of the bracket tubes 242 and 244 with respect to each other as well as the lengths of the links 260 and 262. The strut 274 conveniently provides an adjustable rigid interconnection between the support bracket assembly 238 and the trailing edge of the wing section 56 and, together with the adjustable connection between the tubes 242 and 244, provides for adjustment of the lateral bearing of the tubes 220 with respect to the wing section. The support bracket assembly 238 also comprises a relatively lightweight support structure which may be easily adjusted for aiming the respective launch tubes 220.

Referring now to FIGS. 10 and 14, the pilot seat 84 preferably comprises a molded reinforced plastic bucket type seat structure which may be provided with suitable padding, not shown. The seat 84 is mounted within the cockpit 64 on a unique adjustable support structure comprising opposed spaced apart longitudinally extending support rails 292 which are suitably bolted to depending bosses 293 formed on the bottom side of seat 84. The rails 292 have laterally projecting trunnion portions 294 and 296 disposed at opposite ends thereof. The forward trunnions 294 are journalled in respective bearing tubes 298 comprising part of an eccentric arm assembly 300 mounted for pivotal movement on a fuselage lateral member 302 which extends between and is secured to the booms 28 and 30. The trunnions 296 are slidably journalled in slots 304 formed in a pair of spaced apart tubular track members 306 each suitably welded to a lateral member 308 extending between the fuselage booms 28 and 30. The lateral member 308 is connected to rearwardly inclined support tubes 309 and 311 forming part of pylon 25, see FIGS. 4 and 12 also.

The upper backrest portion 85 of the seat 84 includes a clevis type bracket 310 which is pivotally secured to a seat position lock member 312 by a removable pivot pin 314. The lock member 312 is suitably bored to receive the pivot pin 314 at two positions 316 and 318. The lock member 312 is pivotally supported on a support member 319 extending between and secured to the support tubes 309.

In the forward position of the seat 84, shown by the solid lines in FIG. 10, the lock member 312 is connected to the bracket 310 at the connection formed by the pin 314 and the bore 318 in the lock member. In this position of seat 84 the trunnions 296 are disposed forwardly, to the right viewing FIG. 10, in the slots 304 and the eccentric arm assembly 300 is rotated clockwise to the position shown in FIG. 10. The seat 84 may be moved to and locked in an aft position by removing the pin 314 and rotating the lock member 312 until the bore 316 is aligned with the clevis bracket 310 and whereby the pin 314 is inserted through the bore 316. This position of the seat 84 results in rearward movement of the trunnions 296 in the tracks 306 and rotation of the eccentric arm assembly 300 counterclockwise, viewing FIG. 10. As shown in FIG. 1, the seat 84 is disposed aft of a conventional flight control lever or "stick" 324 which is suitably connected to the ailerons 60 and 62 and the horizontal stabilizer 40 by linkage, not shown.

The aircraft 20 is provided with unique main landing gear wheel brake actuating mechanisms for actuating the hydraulically operated disc type brake assemblies 103 for each of the main landing gear wheels 101. Referring now to FIGS. 1 and 11, port and starboard rudder pedals 334 and 336 are each pivotally mounted on the fuselage transverse member 34 by bearing members 338, respectively. The pedals 334 and 336 are suitably connected to linkage, not shown, for moving the twin rudders 52 and 54 in unison in a conventional manner. The pedals 334 and 336 are also connected to the steerable nose wheel assembly 21, FIG. 1, by respective links 337 which are pivotally connected to respective arms 339 and 341 of a wheel support fork 343. The fork 343 is pivotally supported in a bearing tube 345 mounted on the fuselage 26.

Each of the pedals 334 and 336 is also provided with a brake pedal portion 335, FIG. 11, connected by a hinge 347 to a top lateral edge of the pedal and suitably connected to a hydraulic brake cylinder assembly 340. The brake cylinder assemblies 340 are each suitably hydraulically connected to a brake assembly 103 by way of a conduit 349. The brake pedals 335 are adapted to be actuated by the toe portion of the pilot's respective left and right feet resting on the pedals 336 and 334, respectively. Each brake cylinder assembly 340 comprises a single acting hydraulic cylinder 342 which is connected to a bracket 344 mounted on the back side of each of the brake pedals 334 and 336. The brake cylinder 342 includes a piston rod 346 extending from the upper end of the cylinder, viewing FIG. 11, which is engageable with an actuator arm 348 pivotally connected to the end of the cylinder 342 by a clevis type bracket 350. The distal end of the actuator arm 348 is pivotally connected to a clevis member 351 which is internally threaded for receiving an eyebolt 352 locked in a predetermined longitudinal position with respect to the clevis member 351 by lock nut 354. The opposite end of the eyebolt 352 is pivotally connected to a bracket 356 mounted on the upper edge of the brake pedal 335.

In response to actuation of the brake pedals 335 to rotate them in a clockwise direction, viewing FIG. 11, the linkages 351-352 and arms 348 are actuated to displace the piston rods 346 into the cylinders 342 to displace brake fluid to actuate the respective wheel brake assemblies. The cylinders 342 are spring return type to release braking pressure when the biasing forces on the pedals 335 are released. Thanks to the arrangement of mounting the brake cylinder assemblies 340 on the respective pedals 334 and 336 the entire wheel brake actuating mechanism for the brake assemblies is carried by the rudder pedals themselves and substantially simplifies the brake actuating mechanism for the respective main wheel brakes.

Referring now to FIG. 12, the aircraft 20 is provided with an improved fuel tank arrangement including the fuel tank 86 which includes a main reservoir 366, a sump portion 368 and an anti-slosh baffle 370 interposed therebetween. The tank 86 may be fabricaed of aluminum sheet or comprise a molded fiberglass structure in accordance with conventional fabricating techniques. The tank 86 includes an upwardly projecting filler neck 372 provided with a suitable closure, and an outlet fitting 376 located at the lowest point of the sump portion 368 when the aircraft is in a level flight attitude. The fitting 376 is connected to a suitable fuel supply conduit leading to an engine fuel pump, not shown. Fuel is transferred between the main reservoir 366 and the sump portion 368 through an opening 380 located in the baffle 370 adjacent a bottom wall 382 of the main reservoir 366. A flexible flapper type non-return valve 384 is supported on the baffle 370 for closure over the opening 380 to prevent fuel in the sump portion 368 from transferring to the main reservoir 366. The tank 86 is supported on the fuselage 26 rearward of the pilot seat 84 on two spaced apart support members 390 and 392 extending between pylon members 117. Spaced apart flexible straps 396 and 398 are provided for securing the tank 86 to the pylon 25 and are suitably secured to the pylon members 90 and 117, respectively.

Accordingly, the general arrangement of the pilot seat 84, the fuel tank 86 and the engine 22 places a substantial portion of the fixed weight of the aircraft 20, as well as the payload, including fuel, in a central location so that the aircraft center of gravity is near the optimum center of lift of the wing comprising the wing sections 56 and 58. Those skilled in the art will appreciate that the configuration of the aircraft 20 including the configuration of the pylon structure 25, the location of the fuel tank 86, and the pilot seat 84 is highly advantageous. This overall arrangement in conjunction with the fuselage enclosure and wing root fairings minimizes drag and turbulence effects on the aircraft in flight. These features together with the other improvements described herein are particularly noteworthy in the art of light aircraft. Those skilled in the art will recognize that the aircraft 20 can be modified to carry a two man crew by moving the pilot seat 84 forward and placing a crew seat between the pilot seat 84 and the fuel tank 86. It will also be appreciated that the aircraft 20 can be adapted for aerial spraying operations by suitable placement of spray booms along the undersides of each wing section and mounting a tank between the fuselage booms rearward of the fuel tank 86, for example.

Figure 15:
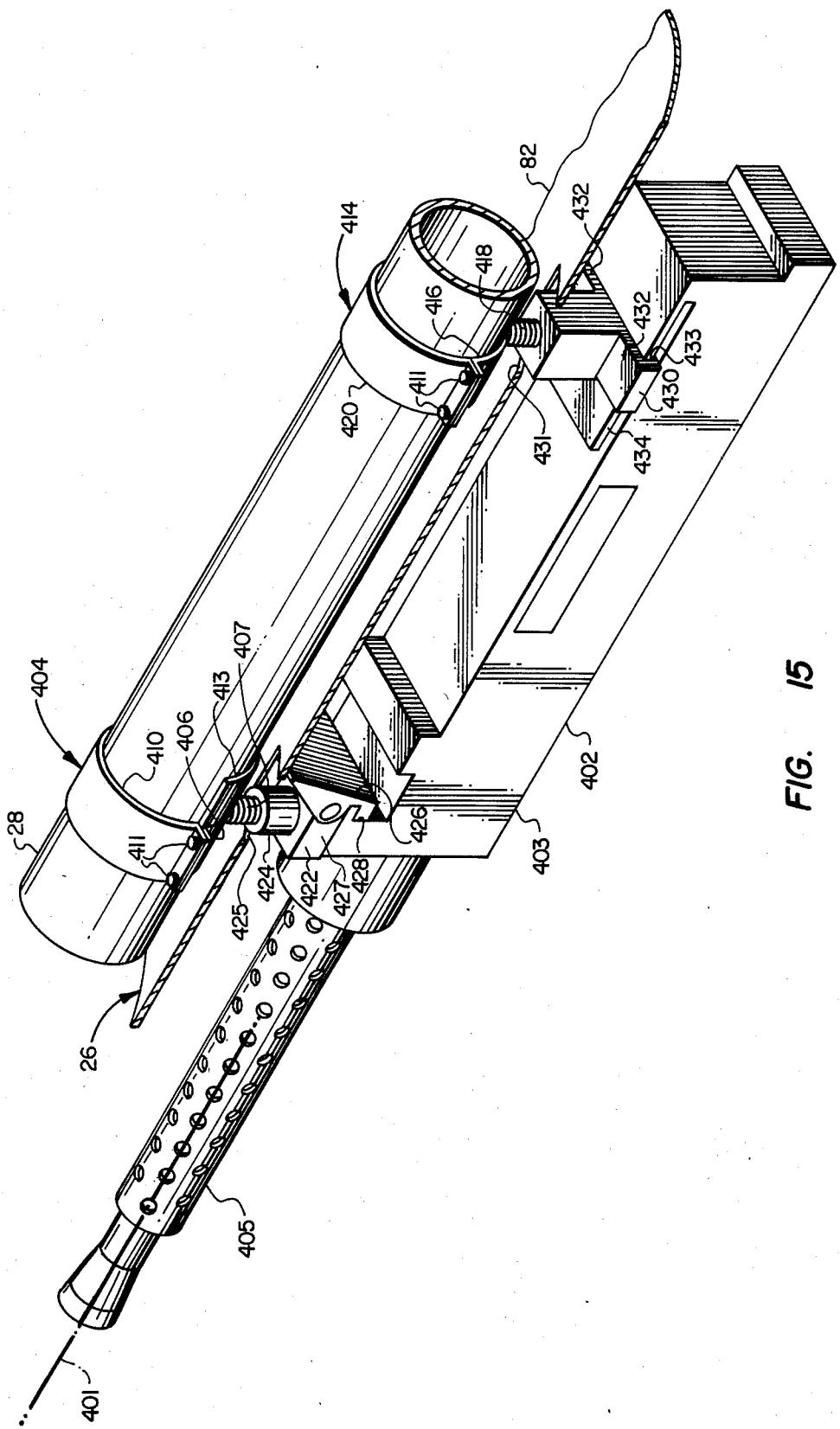
FIG. 15 is a detail perspective view of one of the gun mounts.

The aircraft 20 is further adapted for tactical military use by the placement of automatic cannons or machine guns on one or both sides of the fuselage 26 forward of the wing sections 56 and 58, respectively, and generally along the underside thereof. Referring briefly to FIGS. 1, 3 and 15, as shown by way of example for the fuselage boom 28, there is illustrated a unique adjustable mounting bracket arrangement for a lightweight automatic cannon or machine gun 402 such as a standard 7.62 mm type. The gun mount arrangement comprises a forward bracket assembly 404 formed by a cylindrical support collar 406 conforming to the diameter of the boom 28 and having a laterally projecting threaded post 407 formed thereon. The bracket 404 is suitably releasably secured to the boom 28 by a cooperating strap member 410 and suitable threaded fasteners 411. A thrust boss 413 is also suitably secured to the boom 28 just aft of the mounting bracket 404 and is contiguous with the side of the bracket collar 406 to limit the rearward movement of the bracket and to transfer gun recoil reaction forces to the boom 28. An aft mounting bracket 414 is also characterized by a cylindrical collar 416 having a laterally projecting threaded post 418. A mounting strap 420 is provided for securing the bracket 414 to the boom 28 in a manner similar to the mounting of the bracket 404.

The forward mounting bracket assembly 404 also includes a latching member 422 having an upstanding cylindrical boss 424 extending through an opening 425 in fuselage panel 82 and which is internally threaded to receive the threaded post 407. The latching member 422 also includes a spring biased latch member 426 hinged to a base portion 427 and engageable with a cooperating slot 428 formed on the receiver section 403 of the gun 402. The rear mounting bracket assembly 414 includes a latching member 430 comprising a generally rectangular boss which projects upwardly through a panel opening 431 and is internally threaded for receiving the threaded post 418. The latching member 430 includes opposed shoulders 432 which are formed to define elongated parallel slots 433, one shown, for receiving cooperating longitudinally extending projections 434, one shown, formed on the gun receiver section 403. Accordingly, the gun 402 may be demountably supported on the boom 28 and the other gun 402 is mounted on the boom 30 in an identical manner. The barrel 405 of the gun 402 may be sighted in by adjusting the aft mounting bracket 414 for interval as well as lateral position. For example, the vertical elevation of the longitudinal centerline 401 of the barrel 405 may be adjusted by rotating one or both of the latching members 422 and 430 relative to the posts 407 and 418 in or out to change the vertical elevation. Lateral alignment or sighting of the centerline 401 of barrel 405 may be accomplished by loosening one or both of the strps 410 and 420 and rotating the collar members 406 and 416 about the boom 28 to achieve the desired aiming of the gun 402. The aforementioned procedure is carried out assuming that the gun is hanging in a generally vertically oriented position directly beneath the boom 28. Those skilled in the art will appreciate that the lateral position of the gun 402 may be adjusted by rotating both bracket assemblies 404 and 414 about the boom 28, with suitable modification of the panel openings 425 and 431, whereby the elevation and azimuth adjustments for aiming the gun may be modified in accordance with the general position of the gun with respect to the boom 28. For example, if the gun 402 is positioned in a substantially horizontal plane with the threaded posts 407 and 418 projecting horizontally, the elevation and azimuth adjustments described hereinabove are carried out in substantially the reverse order.

It will be appreciated from the foregoing that a particularly unique light weight fixed wing aircraft is provided in accordance with the present invention. An aircraft as described above may be constructed using conventional engineering materials utilized in light aircraft construction including aluminum or other high strength alloy tubing for the pylon structure 25, the fuselage booms 28 and 30 and the main wing spars 59 for the wing sections 56 and 58. The wing ribs, leading edge stringers and trailing edge stringers may be fabricated from aircraft grade spruce or other high strength-to-weight ratio wood or composite materials. The wing is preferably mounted to the fuselage with a dihedral angle of six degrees and three degrees of forward sweep for improved stability. An aircraft in accordance with the present invention having an overall length of 19 feet, and a wing span of 29 feet, may be fabricated with an empty weight of approximately 325 pounds and a maximum gross take-off weight of 700 pounds, using an engine of approximately 52 hp take-off rating. An aircraft constructed in accordance with the above described parameters has a cruise speed of 50 miles per hour and a top speed of approximately 60 miles per hour with a fuel consumption of approximately three gallons per hour at cruise speed.

Although a preferred embodiment of the aircraft 20 has been described herein in detail those skilled in the art will appreciate that the salient features of the invention may be subject to various modifications or substitutions without departing from the scope and spirit of the invention as recited in the appended claims.

What is claimed is:

1. A fixed wing powered light aircraft characterized by:
  a fuselage including two elongated spaced apart tubular booms extending from a forward end of said fuselage to an aft end and interconnected by spaced apart laterally extending brace members;
  a pylon structure secured to said booms and constructed for supporting a propulsion engine and propellar means drivenly connected to said propulsion engine, said pylon structure comprising a tubular frame and including engine mount means secured to said frame for supporting said engine;
  a cockpit disposed forward of said pylon structure including a pilot seat;
  horizontal and vertical stabilizer means supported on said fuselage at said aft end;
  a streamlined cockpit enclosure including a nose cowl portion and opposed fuselage side panels extending to a point rearward of said pylon structure and including respective curved portions formed to minimize airflow turbulence approaching said stabilizer means;
  opposed wing sections connected to said fuselage adjacent to and on opposite sides of said cockpit; and
  at least one missile support and launch tube supported on each of said wing sections by respective support means, said support means comprising a forward tube support bracket extending from and supported by a frame member of said wing section, and a rear tube support bracket extending from and supported by a frame member of said wing section, and means for adjusting said rear support bracket for aiming said missile tube at a target point forward of said aircraft, said means for adjusting said rear support bracket including means for adjusting the elevation of the longitudinal axis of said missile tube and means for adjusting the lateral bearing of said missile tube, and at least a second missile support and launch tube supported on said wing section and spaced from said first tube, and support means for said second tube including a forward tube support bracket for said second tube extending from and supported by a frame member of said wing section, and a rear support bracket for said second missile tube extending from and supported by a frame member of said wing section, and means for adjusting said rear support bracket for said second missile tube relative to said wing section and said first missile tube for aiming said second missile tube at said target point forward of said aircraft, wherein said rear support brackets include an elongated beam and at least two support links pivotally connected to said beam and to means secured to said frame member of said wing section, means for adjusting the length of said beam, and means for adjusting the length of each of said links, whereby each of said missile tubes can be aimed at a selected target point forward of said aircraft.

2. The aircraft set forth in claim 1 including:
an engine fuel tank secured on said pylon structure rearward of said seat and generally below said engine.

3. The aircraft set forth in claim 2 wherein:
said fuel tank includes portions forming a main reservoir, a sump, and baffle means between said reservoir and said sump and an opening in said baffle means for conducting fuel from said reservoir to said sump, and a non-return valve for preventing fuel from flowing from said sump to said reservoir during roll or pitch up maneuvers of said aircraft.

4. The aircraft according to claim 1 including:
a strut connected to said wing section and to one of said beam and said links for securing said rear support brackets in a predetermined position.

5. The aircraft set forth in claim 1 including:
landing gear comprising spaced apart main wheels supported on opposed strut members, respectively, hydraulic brake assemblies associated with said wheels, respectively, for selectively applying braking forces to each of said wheels independently, a pair of rudder pedals mounted for pivotal movement on said fuselage forward of said seat, each of said pedals including a main pedal portion and a brake pedal portion hinged to said main pedal portion, and hydraulic brake cylinder means connected to said brake pedal portions, respectively, for actuating said brake assemblies in response to movement of said brake pedal portions relative to said main pedal portions.

6. The aircraft set forth in claim 5 wherein:
said cylinder means are mounted on said rudder pedals, respectively, and include linkage means interconnecting said brake pedal portions with said cylinder means for actuating said brake assemblies, selectively.

7. The aircraft set forth in claim 1 wherein:
each of said wing sections is releasably secured to said fuselage by means including an elongated strut secured to said spar at one end and to said pylon structure at the opposite end.

8. The aircraft set forth in claim 1 including:
opposed wing root fairings extending along upper and lower surfaces of said wing sections, respectively, at said cockpit enclosure to form a continuous curved fillet at the juncture of said wing section with said cockpit enclosure, said fairings each extending rearward of said curved portions of said panels and forming a continuation of said wing surface adjacent said booms.

9. The aircraft set forth in claim 8 wherein:
said fairings each comprise at least a first curved fairing panel extending aft along the underside of said wing section and contiguous with said underside of said wing section and said fuselage panel at said wing root, said fairings including portions extending to the juncture of said fuselage panels at said longitudinal axis, said fuselage panels including a curved bottom portion enclosing said pylon structure to minimize turbulent airflow along the bottom of said fuselage and between said booms aft of said pylon structure.

10. The aircraft set forth in claim 9 wherein:
said first curved fairing panels each extend upwardly and around the leading edges of said wing sections, and form a fillet between said fuselage panels and said wing sections, respectively.

11. The aircraft set forth in claim 9 wherein:
said fairings each comprises means forming a second curved fairing panel extending along the upper surface of said wing sections and to the trailing edges of said wing sections and forming a fillet between said wing sections, said fuselage panels and said booms, respectively.

12. The aircraft set forth in claim 11 wherein:
said first and second curved fairing panels are contiguous with each other at respective adjacent ends and comprise the entire wing root fairing for each wing section.

13. The aircraft set forth in claim 12 wherein:
said first and second curved fairing panels are secured to said fuselage with threaded fasteners for removal to provide access to means for connecting and disconnecting said wing sections to said fuselage.

14. The aircraft set forth in claim 1 including:
means forming a gun mount disposed forward on at least one of said booms for a forward firing gun.

15. The aircraft set forth in claim 14 wherein:
said gun mount comprises a first support bracket secured to said boom, a reaction force thrust boss on said boom and engageable with said bracket for transferring gun recoil reaction forces to said boom, and a second bracket spaced from said first bracket and secured to said boom, at least one of said brackets including means for adjusting the position of a gun supported on said brackets for aiming said gun with respect to said boom.

16. The aircraft set forth in claim 15 wherein:
at least one of said support brackets for said gun comprises a collar secured to said boom in one of a plurality of selected position with respect to the central longitudinal axis of said boom, and cooperating threaded members for selectively positioning said gun relative to said collar.

17. The aircraft set forth in claim 1 including:
trailing edge mounted ailerons on each of said wing sections, said ailerons including respective outboard sections having a chordal length greater than the remaining portions of said ailerons to increase the roll axis stability of said aircraft.

18. A fixed wing powered light aircraft characterized by:
a fuselage including two elongated spaced apart tubular booms extending from a forward end of said fuselage to an aft end and interconnected by spaced apart laterally extending brace members;
a pylon structure secured to said booms and constructed for supporting a propulsion engine and propeller means drivenly connected to said propulsion engine, said pylon structure comprising a tubular frame and including engine mount means secured to said frame for supporting said engine;

a cockpit disposed forward of said pylon structure including a pilot seat wherein said seat is mounted on said fuselage by seat support means for supporting said seat in a selected one of at least two positions, said seat support means including an eccentric arm assembly pivotally mounted on said fuselage and connected to opposed elongated seat support rails, said seat support rails being secured to said seat and pivotally connected to said arm assembly for pivotal movement about a transverse axis with respect to the longitudinal central axis of said aircraft, and a seat lock member pivotally secured to support means on said pylon structure and adapted to be connected to a backrest of said seat in a selected one of at least two positions of said lock member relative to said seat for positioning said seat in a selected one of said positions;

horizontal and vertical stabilizer means supported on said fuselage at said aft end;

a streamlined cockpit enclosure including a nose cowl portion and opposed fuselage side panels extending to a point rearward of said pylon structure and including respective curved portions formed to minimize airflow turbulence approaching said stabilizer means; and opposed wing sections connected to said fuselage adjacent to and on opposite sides of said cockpit.

19. A fixed wing powered light aircraft characterized by:

a fuselage including two elongated spaced apart tubular booms extending from a forward end of said fuselage to an aft end and interconnected by spaced apart lateral brace members;

a pylon structure connected to said booms and comprising a tubular frame including means for supporting opposed port and starboard wing sections, and means for supporting opposed landing gear struts, means for supporting a propulsion engine, means for supporting a fuel tank, and a cockpit disposed forward of said pylon structure including pilot seat, a seat support means for supporting said rest in a selected one of at least two positions, said seat support means comprising support members connected to said pylon structure, and to said booms, respectively;

said seat support means including an eccentric arm assembly pivotally mounted on said fuselage and connected to opposed elongated seat support rails, said seat support rails being secured to said seat and pivotally connected to said arm assembly for pivotal movement about a transverse axis with respect to the longitudinal central axis of said aircraft, and a seat lock member pivotally secured to a support member on said pylon structure and adapted to be connected to the back of said seat in a selected one of at least two positions of said lock member relative to said seat for positioning said seat in a selected one of said positions.

20. A fixed wing powered light aircraft comprising a fuselage, port and starboard wing sections secured to said fuselage, said wing sections each including a frame and surface coverings forming an airfoil, and at least one missile support and launch tube supported on the underside of each of said wing sections by respective support means, said support means comprising a forward tube support bracket depending from and supported by a frame member of said wing section, a rear tube support bracket depending from and supported by a frame member of said wing section, and means for adjusting said rear support bracket for aiming said tube at a target point forward of said aircraft, and at least a second missile support and launch tube supported on the underside of said wing section and spaced from said first tube, and support means for said second tube including a forward tube support bracket for said second tube depending from and supported by a frame member of said wing section, and a rear support bracket for said second tube depending from and supported by a frame member of said wing section and means for adjusting said rear support bracket for said second tube for aiming said second tube at a target point forward of said aircraft, said rear support brackets for said first and second tubes including an elongated beam and at least two support links pivotally connected to said beam and to means secured to said frame member of said wing section, means for adjusting the length of the beam, and means for adjusting the length of each of said links so that said first and second tubes can be aimed independently of each other at a target point forward of said aircraft.

21. The aircraft set forth in claim 20 including:
a strut connected to said wing section and to one of said beam and said links for securing said rear support brackets in a predetermined position.

22. The aircraft set forth in claim 20 wherein:
said means supporting at least one of said rear support brackets comprises a trailing edge stringer of said wing section.

* * * * *